(12) United States Patent
Pierre

(10) Patent No.: US 11,371,773 B2
(45) Date of Patent: Jun. 28, 2022

(54) TEMPERATURE CONTROL BOTTLE ASSEMBLY

(71) Applicant: Kensky Pierre, West Palm Beach, FL (US)

(72) Inventor: Kensky Pierre, West Palm Beach, FL (US)

( * ) Notice: Subject to any disclaimer, the term of this patent is extended or adjusted under 35 U.S.C. 154(b) by 426 days.

(21) Appl. No.: 16/719,000

(22) Filed: Dec. 18, 2019

(65) Prior Publication Data

US 2021/0190418 A1    Jun. 24, 2021

(51) Int. Cl.
| | | |
|---|---|---|
| *F25D 31/00* | (2006.01) | |
| *A61J 9/00* | (2006.01) | |
| *A47J 36/24* | (2006.01) | |

(52) U.S. Cl.
CPC ........ *F25D 31/005* (2013.01); *A47J 36/2433* (2013.01); *A61J 9/00* (2013.01); *A61J 2200/42* (2013.01); *A61J 2200/44* (2013.01)

(58) Field of Classification Search
CPC . F25D 31/005; A61J 2200/40; A61J 2200/42; A61J 2200/44; A47J 36/2433; A47J 36/2411
See application file for complete search history.

(56) References Cited

U.S. PATENT DOCUMENTS

| | | | |
|---|---|---|---|
| 2,246,677 A * | 6/1941 | Hanks | A47J 36/2433 |
| | | | 392/338 |
| 5,842,353 A * | 12/1998 | Kuo-Liang | F25B 21/04 |
| | | | 219/419 |
| 6,119,461 A | 9/2000 | Stevick | |
| 6,530,232 B1 | 3/2003 | Kitchens | |
| D500,639 S | 1/2005 | Cauchy | |
| 7,089,749 B1 | 8/2006 | Schafer | |
| 8,759,721 B1 | 1/2014 | Alexander | |
| 9,995,529 B1 * | 6/2018 | Banks | F25B 21/02 |
| 2004/0045973 A1 | 3/2004 | Stokes | |
| 2014/0091083 A1 * | 4/2014 | McGarvey | H05B 6/108 |
| | | | 219/634 |
| 2016/0123660 A1 * | 5/2016 | Peng | H05B 3/68 |
| | | | 219/623 |

\* cited by examiner

*Primary Examiner* — Andrew T Kirsch

(57) ABSTRACT

A temperature control bottle assembly for heating and cooling drinks includes a base control apparatus and at least one conductive bottle apparatus. The base control apparatus comprises a cylindrical housing having a pair of semicircular depressions extending towards a bottom side defining a left half, a right half, and a divider wall extending therebetween. A heat exchange is coupled within an inner cavity and comprises a CPU, a heating element disposed beneath the right half, and a cooling filament disposed beneath the left half. A power supply and a plurality of controls are in operational communication with the heat exchange. The conductive bottle apparatus comprises a bottle and a thermally conductive bottom plate coupled to the bottle. The bottom plate has a pair of semicircular protrusions corresponding to, and selectively engageable with, the pair of depressions of the housing to control the temperature of the bottle contents.

12 Claims, 5 Drawing Sheets

TEMPERATURE CONTROL BOTTLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to beverage vessels and more particularly pertains to a new beverage vessel for heating and cooling drinks.

BRIEF SUMMARY OF THE INVENTION

An embodiment of the disclosure meets the needs presented above by generally comprising a base control apparatus and at least one conductive bottle apparatus. The base control apparatus comprises a cylindrical housing having a top side separated from a bottom side and a sidewall extending therebetween to form an inner cavity. The top side has a pair of semicircular depressions extending towards the bottom side. The pair of semicircular depressions defines a left half, a right half, and a divider wall extending across a diameter of the top side therebetween. A heat exchange is coupled to the housing within the inner cavity and comprises a CPU, a heating element disposed beneath the right half, and a cooling filament disposed beneath the left half. A power supply is coupled to the housing within the inner cavity and is in operational communication with the heat exchange. A plurality of controls is coupled to the sidewall and is in operational communication with the heat exchange. The conductive bottle apparatus comprises a bottle comprising a bottle body and a top. A bottom plate is coupled to a bottom end of the bottle body and has a pair of semicircular protrusions corresponding to, and selectively engageable with, the pair of depressions of the housing of the base control apparatus. The pair of protrusions has a height equal to, or greater than, a depth of the pair of depressions. The bottom plate is thermally conductive.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
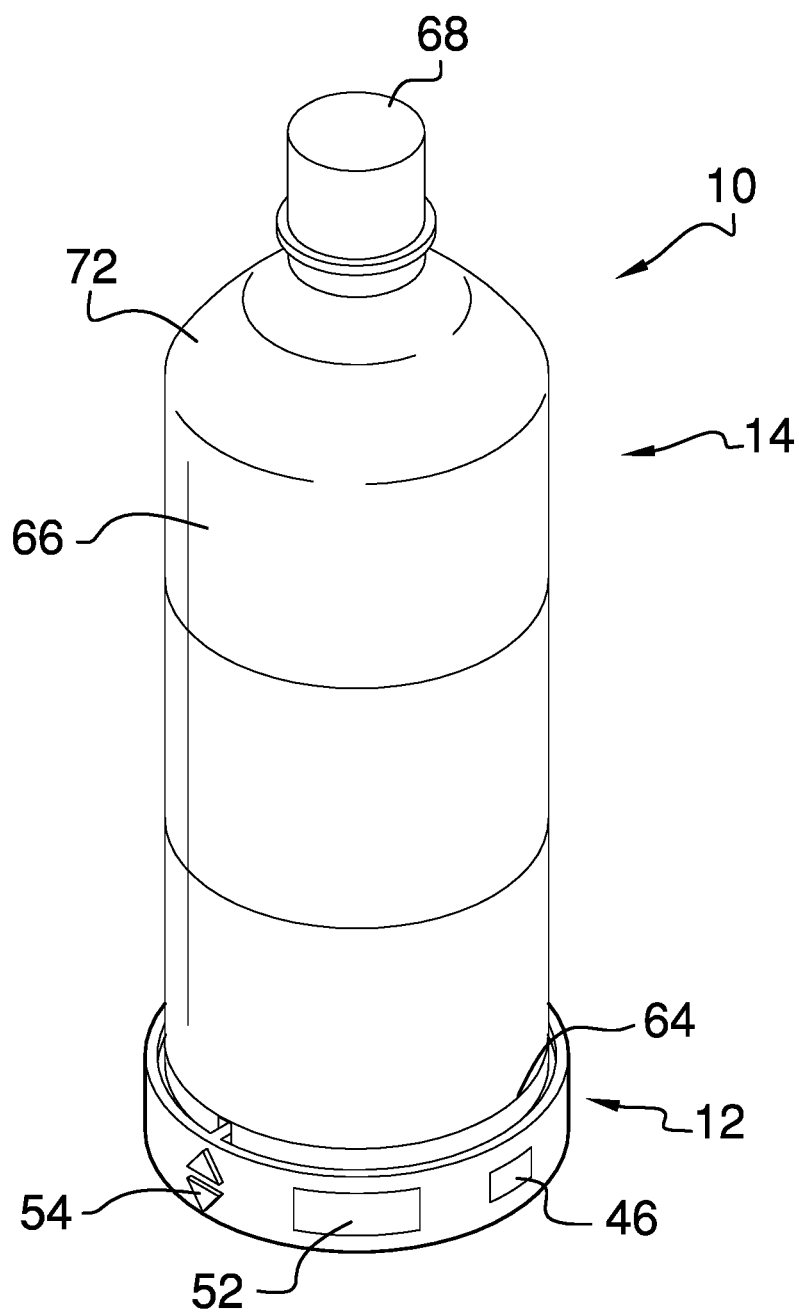
FIG. 1 is an isometric view of a temperature control bottle assembly according to an embodiment of the disclosure.
Figure 2:
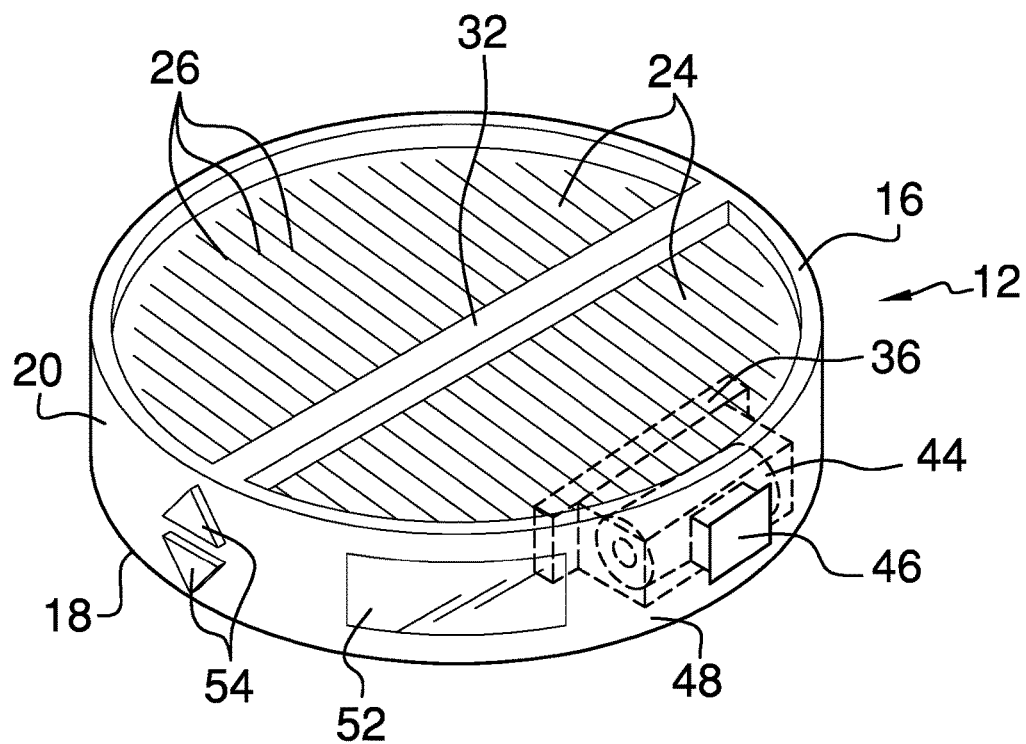
FIG. 2 is an isometric view of an embodiment of the disclosure.
Figure 3:
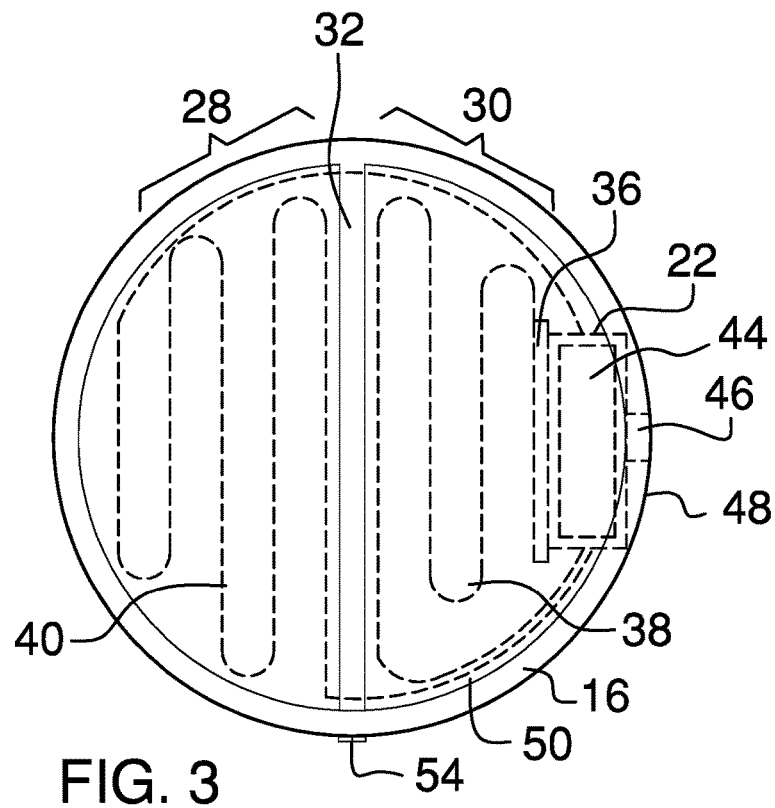
FIG. 3 is a top plan view of an embodiment of the disclosure.
Figure 4:
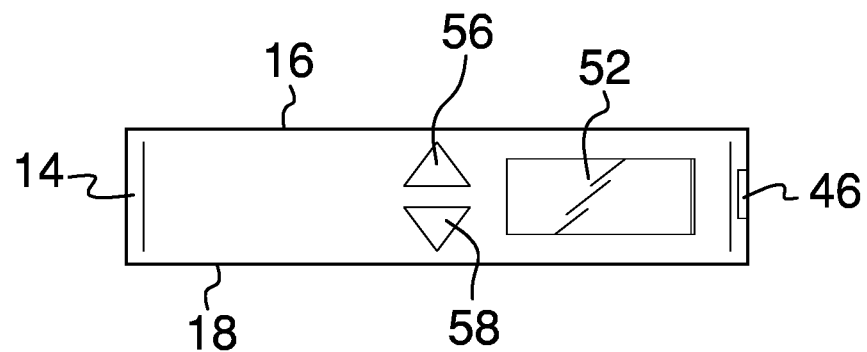
FIG. 4 is a front elevation view of an embodiment of the disclosure.
Figure 5:
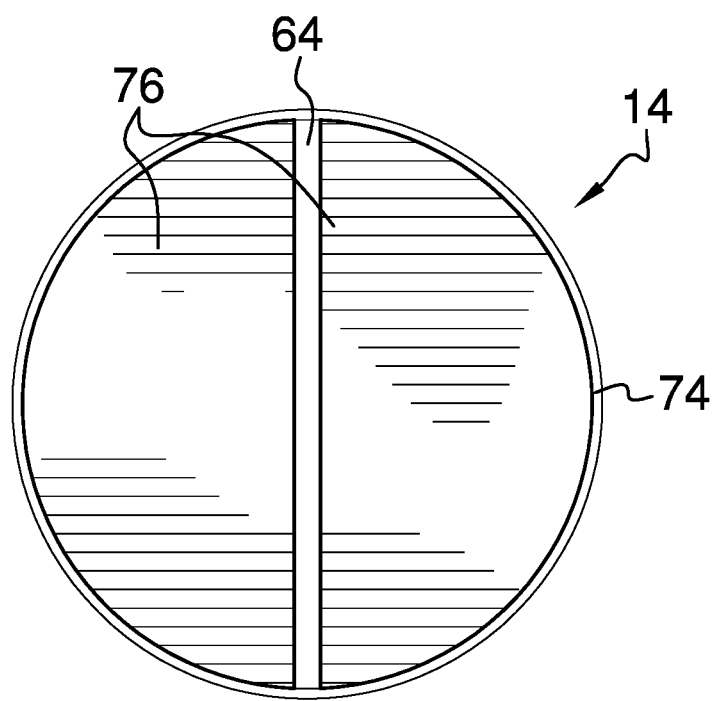
FIG. 5 is a bottom plan view of an embodiment of the disclosure.
Figure 6:
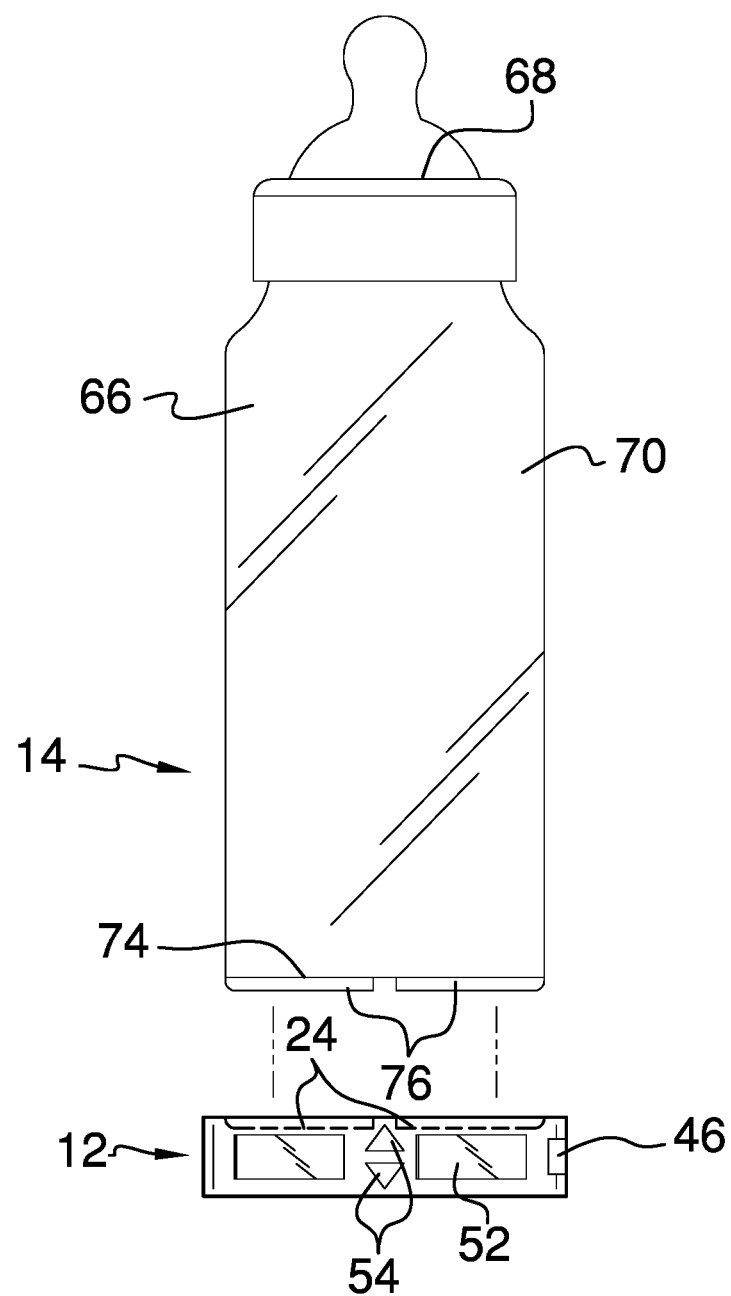
FIG. 6 is an exploded view of an embodiment of the disclosure.
Figure 7:
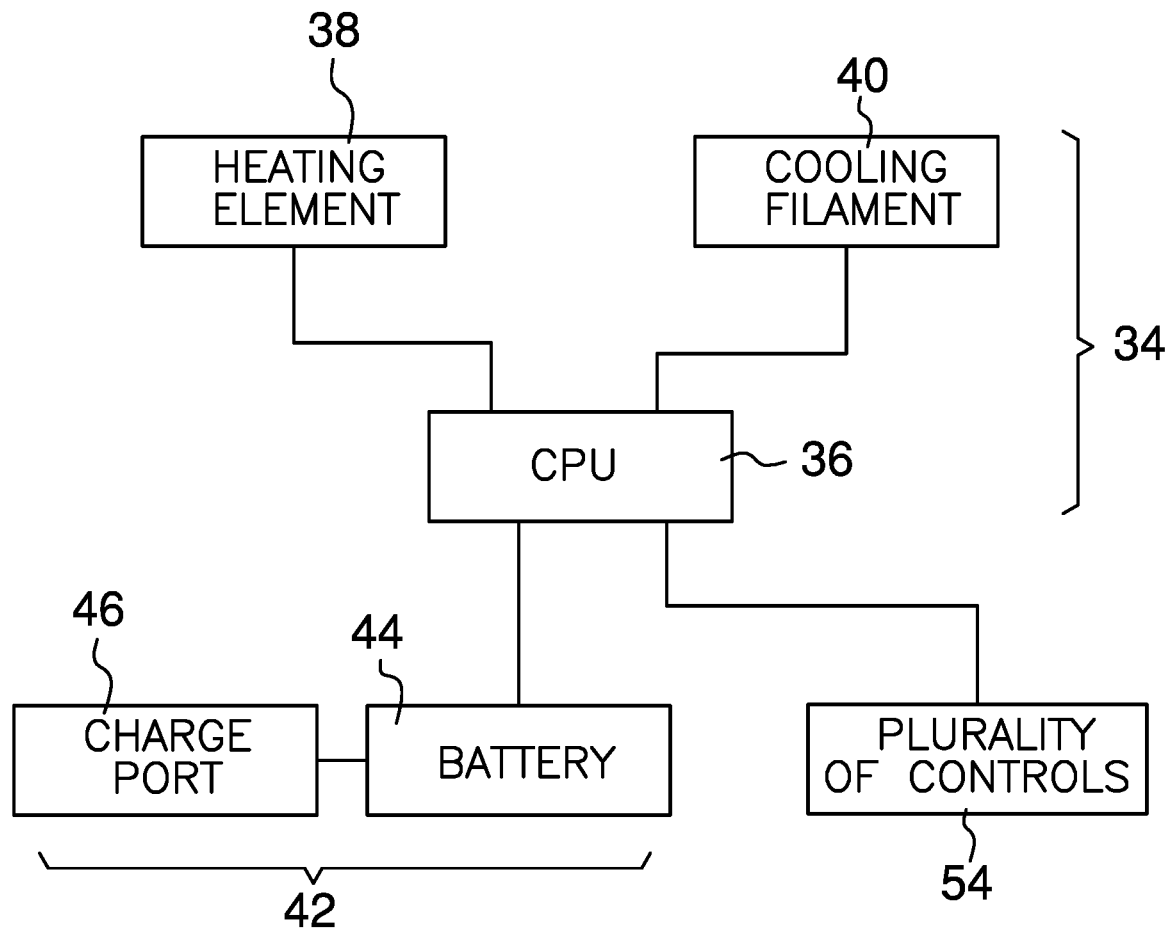
FIG. 7 is a block diagram of an embodiment of the disclosure.

With reference now to the drawings, and in particular to FIGS. 1 through 7 thereof, a new beverage vessel embodying the principles and concepts of an embodiment of the disclosure and generally designated by the reference numeral 10 will be described.

As best illustrated in FIGS. 1 through 7, the temperature control bottle assembly 10 generally comprises a base control apparatus 12 and at least one conductive bottle apparatus 13. The base control apparatus 12 comprises a cylindrical housing 14 having a top side 16 separated from a bottom side 18 and a sidewall 20 extending therebetween to form an inner cavity 22. The top side 16 has a pair of semicircular depressions 24 extending towards the bottom side 18. The top side 16 has a plurality of parallel grooves 26 within the pair of depressions 24 to provide added grip. The pair of semicircular depressions 24 defines a left half 28, a right half 30, and a divider wall 32 extending across a diameter of the top side 16 therebetween.

A heat exchange 34 is coupled within the inner cavity 22 and comprises a CPU 36, a heating element 38 disposed beneath the right half 30, and a cooling filament 40 disposed beneath the left half 28. A power supply 42 is coupled within the inner cavity 22 and is in operational communication with the heat exchange 34. The power supply 42 may comprise a rechargeable battery 44 and a charge port 46 extending through the sidewall 20 and configured to receive a charging cable. The charge port 46 may be a USB port. The power supply 42 is disposed adjacent a right side 48 of the sidewall and the heating element 38 is coiled within the right half 30 adjacent the power supply. The cooling filament 40 extends around a perimeter 50 of the right half 30 and is coiled within the left half 28.

A display 52 is coupled to the housing 14. The display 52 is rectangular and is coupled to the sidewall 20 extending from proximal the top side 16 to proximal the bottom side 18. The display 52 is in operational communication with the heat exchange 34 to show a current temperature and a set temperature of the heat exchange 34. A plurality of controls 54 is coupled to the sidewall 20 and is in operational communication with the heat exchange 34 to provide the set temperature of the heat exchange 34. The plurality of controls 54 comprises an up control 56 and a down control 58. Each of the up control 56 and the down control 58 may be triangular with the up control 56 oriented upward and the down control 58 oriented downwards for intuitive use for the up control 56 raising the temperature of the heat exchange 34 and the down control 58 lowering the temperature of the heat exchange 34. The CPU 36 detects a difference between the current temperature of the top side 16 and the set temperature of the heat exchange 34 to activate either the heating element 38 or alternatively the cooling filament 40. The up control 56 and the down control 58 are horizontally symmetrical and may be coupled to a front side 60 of the housing and aligned with the divider wall 32. The display 52 is coupled between the plurality of controls 54 and the charge port 46 to group all electronics and improve manufacturing efficiency.

The conductive bottle apparatus 13 comprises a bottle 62 and a bottom plate 64. The bottle 62 comprises a bottle body 66 and a top 68. The bottle 62 may be, but is not limited to, a baby bottle 70 and a water bottle 72. The bottom plate 64 is coupled to a bottom end 74 of the bottle body and has a pair of semicircular protrusions 76 corresponding to, and selectively engageable with, the pair of depressions 24 of the housing of the base control apparatus 12. The pair of protrusions 76 has a height equal to, or greater than, a depth of the pair of depressions 24 to prevent the divider wall 32 from interfering with the stability of the bottle 62 when engaged with the base control apparatus 12. The bottom plate 64 is thermally conductive and may be metal.

In use, the bottle 62 is placed with bottom plate 64 engaging the pair of depressions 24 of the base control apparatus. The plurality of controls 54 is then used to heat or cool the bottle 62 and hence the contents of the bottle body 66 rapidly through the bottom plate 64.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A temperature control bottle assembly comprising:
   a base control apparatus comprising:
      a cylindrical housing having a top side separated from a bottom side and a sidewall extending therebetween forming an inner cavity, the top side having a pair of semicircular depressions extending towards the bottom side, the pair of semicircular depressions defining a left half, a right half, and a divider wall extending across a diameter of the top side therebetween;
      a heat exchange coupled to the housing, the heat exchange being coupled within the inner cavity and comprising a CPU, a heating element disposed beneath the right half, and a cooling filament disposed beneath the left half,
      a power supply coupled to the housing, the power supply being coupled within the inner cavity and in operational communication with the heat exchange; and
      a plurality of controls coupled to the housing, the plurality of controls being coupled to the sidewall and in operational communication with the heat exchange; and
   at least one conductive bottle apparatus comprising:
      a bottle, the bottle comprising a bottle body and a top; and
      a bottom plate coupled to the bottle, the bottom plate being coupled to a bottom end of the bottle body and having a pair of semicircular protrusions corresponding to, and selectively engageable with, the pair of depressions of the housing of the base control apparatus, the pair of protrusions having a height equal to, or greater than, a depth of the pair of depressions, the bottom plate being thermally conductive.

2. The temperature control bottle assembly of claim 1 further comprising a display coupled to the housing, the display being coupled to the sidewall and in operational communication with the heat exchange to show a current temperature and a set temperature of the heat exchange.

3. The temperature control bottle assembly of claim 2 further comprising the display being rectangular and extending from proximal the top side to proximal the bottom side.

4. The temperature control bottle assembly of claim 1 further comprising the plurality of controls comprising an up control and a down control, the up control raising the temperature of the heat exchange and the down control lowering the temperature of the heat exchange.

5. The temperature control bottle assembly of claim 4 further comprising each of the up control and the down control being triangular, the up control being oriented upward and the down control being oriented downward, the up control and the down control being horizontally symmetrical.

6. The temperature control bottle assembly of claim 1 further comprising the power supply comprising a rechargeable battery and a charge port, the charge port extending through the sidewall and being configured to receive a charging cable.

7. The temperature control bottle assembly of claim 1 further comprising the power supply being disposed adjacent a right side of the sidewall, the heating element being coiled within the right half adjacent the power supply and the cooling filament extending around a perimeter of the right half and being coiled within the left half.

8. The temperature control bottle assembly of claim 1 further comprising the bottom plate being metal.

9. The temperature control bottle assembly of claim 1 further comprising the bottle being a baby bottle.

10. The temperature control bottle assembly of claim 1 further comprising the top side of the housing having a plurality of parallel grooves within the pair of depressions.

11. A temperature control bottle assembly comprising:
   a base control apparatus comprising:
      a cylindrical housing having a top side separated from a bottom side and a sidewall extending therebetween forming an inner cavity, the top side having a pair of semicircular depressions extending towards the bottom side, the top side having a plurality of parallel grooves within the pair of depressions, the pair of semicircular depressions defining a left half, a right half, and a divider wall extending across a diameter of the top side therebetween;
      a heat exchange coupled to the housing, the heat exchange being coupled within the inner cavity and comprising a CPU, a heating element disposed beneath the right half, and a cooling filament disposed beneath the left half,
      a power supply coupled to the housing, the power supply being coupled within the inner cavity and in operational communication with the heat exchange, the power supply comprising a rechargeable battery and a charge port, the charge port extending through the sidewall and being configured to receive a charging cable, the power supply being disposed adjacent a right side of the sidewall, the heating element being coiled within the right half adjacent the power supply and the cooling filament extending around a perimeter of the right half and being coiled within the left half;
      a display coupled to the housing, the display being rectangular and coupled to the sidewall extending from proximal the top side to proximal the bottom side, the display being in operational communication with the heat exchange to show a current temperature and a set temperature of the heat exchange; and
      a plurality of controls coupled to the housing, the plurality of controls being coupled to the sidewall and in operational communication with the heat exchange to provide the set temperature of the heat exchange, the plurality of controls comprising an up control and a down control, each of the up control and the down control being triangular, the up control being oriented upward and the down control being oriented downward, the up control and the down control being horizontally symmetrical, the up control raising the temperature of the heat exchange and the down control lowering the temperature of the heat exchange; and
   at least one conductive bottle apparatus comprising:
      a bottle, the bottle comprising a bottle body and a top; and
      a bottom plate coupled to the bottle, the bottom plate being coupled to a bottom end of the bottle body and having a pair of semicircular protrusions corresponding to, and selectively engageable with, the pair of depressions of the housing of the base control apparatus, the pair of protrusions having a height equal to, or greater than, a depth of the pair of depressions, the bottom plate being thermally conductive metal.

12. A temperature control bottle assembly comprising:
   a base control apparatus comprising:
      a cylindrical housing having a top side separated from a bottom side and a sidewall extending therebetween forming an inner cavity, the top side having a pair of semicircular depressions extending towards the bottom side, the top side having a plurality of parallel grooves within the pair of depressions, the pair of semicircular depressions defining a left half, a right half, and a divider wall extending across a diameter of the top side therebetween;
      a heat exchange coupled to the housing, the heat exchange being coupled within the inner cavity and comprising a CPU, a heating element disposed beneath the right half, and a cooling filament disposed beneath the left half,
      a power supply coupled to the housing, the power supply being coupled within the inner cavity and in operational communication with the heat exchange, the power supply comprising a rechargeable battery and a charge port, the charge port extending through the sidewall and being configured to receive a charging cable, the power supply being disposed adjacent a right side of the sidewall, the heating element being coiled within the right half adjacent the power supply and the cooling filament extending around a perimeter of the right half and being coiled within the left half;
      a display coupled to the housing, the display being rectangular and coupled to the sidewall extending from proximal the top side to proximal the bottom side, the display being in operational communication with the heat exchange to show a current temperature and a set temperature of the heat exchange; and
      a plurality of controls coupled to the housing, the plurality of controls being coupled to the sidewall and in operational communication with the heat exchange to provide the set temperature of the heat exchange, the plurality of controls comprising an up control and a down control, each of the up control and the down control being triangular, the up control being oriented upward and the down control being oriented downward, the up control and the down control being horizontally symmetrical, the up control raising the temperature of the heat exchange and the down control lowering the temperature of the heat exchange; and
   at least one conductive bottle apparatus comprising:
      a baby bottle, the baby bottle comprising a bottle body and a nipple top; and
      a bottom plate coupled to the bottle, the bottom plate being coupled to a bottom end of the bottle body and having a pair of semicircular protrusions corresponding to, and selectively engageable with, the pair of depressions of the housing of the base control apparatus, the pair of protrusions having a height equal to, or greater than, a depth of the pair of depressions, the bottom plate being thermally conductive metal.

* * * * *